United States Patent [19]

Svensson et al.

[11] Patent Number: 5,995,394
[45] Date of Patent: Nov. 30, 1999

[54] DEVICE FOR CONNECTING A VSC CONVERTER TO A SOURCE OF ALTERNATING VOLTAGE

[75] Inventors: Kjell Svensson, Ludvika; Rolf Pålsson, Saxdalen, both of Sweden

[73] Assignee: Asea Brown Boveri AB, Vasteras, Sweden

[21] Appl. No.: 09/031,072

[22] Filed: Feb. 26, 1998

[30] Foreign Application Priority Data

Oct. 10, 1997 [SE] Sweden ................................. 9703685

[51] Int. Cl.[6] ........................... H02H 7/00; H02H 7/125; H01H 73/00
[52] U.S. Cl. ............................... 363/51; 363/53; 363/56; 361/115
[58] Field of Search ............................. 363/50, 51, 53, 363/54, 56, 57, 58; 361/18, 115, 58, 77

[56] References Cited

U.S. PATENT DOCUMENTS

| | | | |
|---|---|---|---|
| 3,702,962 | 11/1972 | Wohr et al. ................................. | 321/14 |
| 4,133,026 | 1/1979 | Häusler . | |
| 4,148,088 | 4/1979 | Meroni ....................................... | 363/50 |
| 5,187,651 | 2/1993 | Ekstrom ..................................... | 363/35 |
| 5,627,738 | 5/1997 | Lubomirsky et al. ..................... | 363/50 |
| 5,668,418 | 9/1997 | Carlsson et al. .......................... | 361/113 |

FOREIGN PATENT DOCUMENTS 0 293 219 A2  11/1988  European Pat. Off. ....... H02M 7/515

Primary Examiner—Peter S. Wong
Assistant Examiner—Bao Q. Va
Attorney, Agent, or Firm—Pollock, Vande Sande & Priddy, R.L.L.P.

[57] ABSTRACT

A first MOS transistor of a specific conductive type and a second MOS transistor of the specific conductive type are combined in an electrostatic circuit protection. In the first MOS transistor, a drain thereof is connected to an output terminal or an input terminal and a source thereof is connected to a first power terminal. The first MOS transistor is turned on/off by a signal received by a gate or ordinarily turned off by holding the gate at a specific potential. In the second MOS transistor of the specific conductive type, a drain thereof is connected to the output terminal or the input terminal and a source thereof is connected to a gate of the first MOS transistor. The second MOS transistor is ordinarily turned off by connecting a gate thereof to the first power terminal.

21 Claims, 1 Drawing Sheet

DEVICE FOR CONNECTING A VSC CONVERTER TO A SOURCE OF ALTERNATING VOLTAGE

BACKGROUND OF THE INVENTION

The present invention relates to a device for providing a Voltage Source Convertor (VSC converter) for converting direct voltage to alternating voltage, and alternating voltage into direct voltage in a plant for transmitting electric power. The VSC converter is connected to an active alternating voltage network having at least two phases and has a direct voltage side providing a direct voltage across at least one capacitor upon connection of the converter to the alternating voltage network. An inductance is connected between the alternating voltage network and the converter. A first breaking means is provided in each connection line between each phase of the alternating voltage network and the converter for connecting the respective alternating voltage phase to the VSC converter. The device conducts current to charge the capacitor through a resistance.

The VSC converter may be connected to a direct voltage network for producing high voltage direct current (HVDC). A plant for transmitting electric power between such a direct voltage network and an alternating voltage network has recently become known through the disclosure "PWM and control of two and three-level High Power Voltage Source Converters" by Anders Lindberg, Kungliga Tekniska Högskolan, Stockholm, 1995. However, it is emphasized that the invention is not restricted to this application. The VSC converter could, for example, be a part of an SVC (Static Var Compensator), in which the direct voltage side of the converter is not connected to any direct voltage network.

The number of phases of said alternating voltage network, and therefore the number of phase legs of the VSC converter, may be arbitrary. The invention is directed to a device for connecting a VSC converter to an alternating voltage network of at least two phases, however, there are usually three phases. The three phases of the alternating voltage network require three phase legs of the VSC converter, and therefore a total of six current valves, in which the converter constitutes a six-pulse bridge.

In a state in which a converter is not connected to the alternating voltage network, and there is in principle no direct voltage across said capacitor. When the converter is connected to the alternating voltage network, the capacitor will, in such a connection of the alternating voltage network, be charged through the diodes in the bridge of the converter, since the semiconductor elements, which are turn-off type, preferably IGBTs connected in anti-parallel therewith, are blocked and not controllable in this state. Energy is stored in the inductance as a consequence of the charging current. The inductance may be constituted by a transformer or inductors when the converter does not have any transformer. This energy will charge the capacitor beyond peak-rectifying voltage when the charging current sinks to an over-voltage condition. As a consequence, these systems have been adapted to conduct the current charging the capacitor through a resistance, which so far has been accomplished at high voltages, e.g., within the range 100 kV to 500 kV. A first breaking means connects a resistor into the respective connection line (phase leg), between the converter and the respective phase of the alternating voltage network, so as to reduce the charging current and drastically reduce the energy oscillating between the inductor and the capacitor. The resistor is then disconnected, so that the current in the respective connection line is shunted past the resistor so as not to cause unnecessary losses. Resistors have been incorporated in all the first breaking means, since these close simultaneously, and it is not known which of the phases of the alternating voltage network leads in time and, therefore, which one will initially charge the capacitor. This solution to the problem of over-voltage conditions across the capacitor occurring upon connection of a VSC converter to an active alternating voltage network when providing the converter with voltage is comparatively costly, and normally not accessible for so-called medium voltage breakers, for voltages between 10 and 100 kV.

SUMMARY OF THE INVENTION

The object of the present invention is to provide a device which solves the problems of over-voltages when a VSC converter provides a voltage in a simpler and therefore less costly way.

This object is according to the invention obtained by providing a device having at least one additional breaking means connected in series with a resistance to provide the VSC converter with voltage by connecting only one of the phases of the alternating voltage network to the VSC converter, charging the capacitor at the direct voltage side through the resistor. It enables delaying closing of the first breaking means to connect all the phases of the alternating voltage network to the VSC converter with respect to closing the additional breaking means.

By closing the additional breaking means, for connecting only one of the phases of the alternating voltage network to the converter which voltage, it is possible to charge the capacitor with one single resistance connected in series with the additional breaking means. The resistance does not have to be incorporated in the first breaking means, so that the device is considerably less costly than the known devices of this type. Thus, the very basic idea of the invention is that the charging of the capacitor takes place through one single phase of the alternating voltage network, and therefore only one connection of one phase to the converter has to be provided with a resistor. By closing the first breaking means to connect all the phases of the alternating voltage network to the converter to complete the connection of the alternating voltage network to the converter with a delay following closure of the additional breaking means, the converter will already have voltage at the time the rest of the phases of the alternating voltage network are connected, so that it does not need to draw significant current, since the capacitor has been previously charged.

According to a preferred embodiment of the invention the additional breaking means is operated as a disconnector, which is possible since it does not have to be operated when voltage is connected thereto. This makes this means considerably less costly than if a breaker were used.

According to a preferred embodiment of the invention, the first breaking means in the connection line to one of the phases establishes a connection of the phase to the converter while shunting the resistance. The resistance is only switched in during the initial supply of output voltage and will not cause any unnecessary losses thereafter.

According to another preferred embodiment of the invention the resistance is connected in parallel with a set of contacts of the first breaking means, and the additional breaking means, is in series with the parallel connection of the resistance and the first breaking means to realize the invention in a simple way.

According to another preferred embodiment of the invention the device comprises a second breaking means in series with each connection line between the first breaking means and the respective alternating voltage phase. The first breaking means are disconnectors and the second breaking means are breakers which are closed before the first breaking means are closed when the converter is providing voltage. The first breaking means and the additional breaking means preferably provide visible isolation of portions of the respective connection line located on both sides thereof when they are in an open state, making it possible to safely carry out work on the converter.

According to another preferred embodiment of the invention an alternating current filter for eliminating harmonic currents is connected to the connection line of said one phase at a point between the resistance and the second breaking means. This filter current does not flow through the resistor, and the rated power of the resistor may be reduced considerably reducing the cost of the device.

According to an additional preferred embodiment of the invention, which constitutes a flier development of the previous embodiment, the additional breaking means are formed by a second breaking means arranged in the connection line for one of the phases. This is a way of realizing the additional breaking means, but this may also be constituted by another breaking means, arranged in the connection line of one of the phases in series with the first breaking means of this phase between the converter and the first breaking means.

According to another preferred embodiment of the invention the device comprises means to measure the voltage across the capacitor, and use the measured voltage to close the first breaking means when the voltage across the capacitor exceeds a predetermined threshold voltage. This ensures that the charging of the capacitor with the resistance through one phase to a high level which avoids any problems of connecting the other phases which have no switching-in resistor.

According to another preferred embodiment of the invention the device comprises means to measure the voltage across the capacitor after providing the converter with voltage by closing the additional breaking means. Means are provided to measure the time following the start of the converter providing voltage in response to connection of one phase to the alternating voltage supply to the converter. These means send information about the measured voltage and the measured time to the circuit arrangement to control the additional breaking means to disconnect the one phase from the converter without closing the first breaking means, if a predetermined period of time has elapsed after closure of the additional breaking means, without reaching a predetermined value of voltage across the capacitor. This ensures that any connection of the alternating voltage network to the converter will not take place when any fault has occurred on the direct voltage side of the VSC converter, such as an earth fault, resulting in the voltage across the capacitor not reaching the desired level within a predetermined time period.

According to a further preferred embodiment of the invention the device is adapted to provide voltage from a VSC converter to a direct voltage network for High Voltage Direct Current (HVDC).

Further advantages as well as advantageous features of the invention will appear from the following description.

DESCRIPTION OF THE DRAWINGS

With reference to the appended drawing, below follows a description of preferred embodiments of the invention cited as examples.

DETAILED DESCRIPTION OF THE INVENTION

Figure 1:
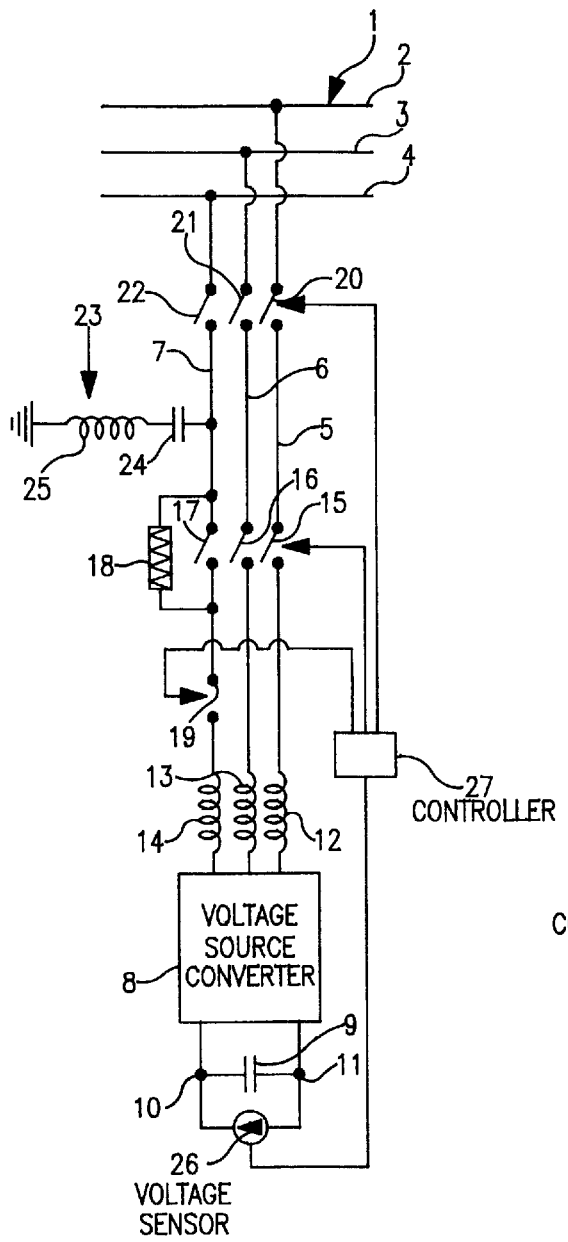
FIG. 1 is a schematic diagram illustrating a device for voltage providing a VSC converter with voltage according to a first preferred embodiment of the invention.

A part of a plant for transmitting electric power, upon which a device according to a first preferred embodiment of the invention is applied, is schematically illustrated in FIG. 1, and only those components which have something directly to do with the function according to the invention, or are required for explanation and comprehension of the invention, are shown. The plant comprises an alternating voltage network 1, which in the present case has three phases 2, 3, 4. The phases of the alternating voltage network are connected to the alternating voltage side of a VSC converter 8 through connection lines 5, 6 and 7. The converter 8 converts direct voltage into alternating voltage and conversely, alternating voltage into direct voltage, and is a part of a station not shown for this purpose. The direct voltage side of the converter includes a capacitor 9 for establishing the direct voltage. Terminals 10, 11 of the capacitor may be connected to pole conductors (not shown) of a direct voltage network for high voltage direct current (HVDC=High Voltage Direct Current), or the capacitor may hang freely should it be a part of an SVC (Static Var Compensator).

Although it is not shown, the VSC converter comprises, in a conventional way, a phase leg for each phase formed by an extension of the connection lines having two current valves, which includes branches of breakers of the tun-on and ran-off type, connected in series, preferably in the form of IGBTs, and diodes connected anti-parallel therewith. A great number of IGBTs may be connected in series in one single valve which are turned on and turned off simultaneously so as to function as one single breaker. The voltage across the valve is therefore divided among the different breakers connected in series. The control of the breakers takes place through any kind of pulse width modulation (PWM).

The alternating voltage network 1 is active in this type of plant for transmitting electric power, which means that there is an applied alternating voltage if the connection to the converter 8 is broken. The capacitor 9 is not charged and has no voltage thereacross when the connection to the alternating voltage network is disconnected. As mentioned, the invention relates to a device for providing voltage from converter 8 in a so-called new-starting of the plant, i.e., the converter 8 voltage is provided when the alternating voltage network 1 is connected thereto.

The converter is in the present case without any transformer and has instead inductors 12, 13, 14 at the alternating voltage side thereof. If the connection to the alternating voltage network suddenly takes place through a direct connection of one or more of the connection lines 5, 6, 7 from the alternating voltage network to the converter, then as desired, the capacitor 9 would be charged through the diodes in the respective current valve, but as a consequence of the charging current energy is stored in the inductor or the inductors. When the current then drops the stored energy charges the capacitor beyond the peak-rectifying value and causes an over-voltage. However, the device according to the invention avoids this. The device has for this reason the breaking means arranged in the connection lines in the form of disconnectors 15, 16, 17 to connect the respective phase to the converter. These disconnectors as well as the other breaking means shown in the figure are of a mechanical type, and the disconnectors 15–17 cause a visible isolation of portions of the respective connection line arranged on both sides of the disconnectors 15–17. Staff may visibly make sure that there is no voltage on the converter side thereof when work is to be carried out on the converter.

A resistor 18 is connected in parallel with one of the disconnectors 17 connected to one phase 4 of the alternating voltage network. Furthermore, an additional breaking means 19 in the form of a disconnector is connected in series with the parallel connection of the disconnector 17 and the resistor 18 between the parallel connection and the converter. Also, the disconnector 19 has to visibly indicate the circuit isolation in the open state, since the resistor 18 is connected across the disconnector 17 and short-circuits it.

The device also comprises a second breaking means in the form of a breaker 20, 21, 22 arranged in each connection line in series with and between the disconnector 15–17 and the respective alternating voltage phase.

It is also indicated how an alternating current filter 23 with capacitance 24 and inductance 25 is connected to the connection line 7 to the one phase 4 between the phase and the parallel connection of the disconnector 17 and the resistor 18.

The device has means 26 adapted to measure the voltage across the capacitor 9 and send the measured information to an arrangement 27, which controls the different breaking means on the basis of voltage information, and the time elapsed from the connection of the converter 8 to one phase of the alternating voltage network as described below.

The function of the device according to the preferred embodiment of the invention is as follows. When the converter 8 is to be connected to the alternating voltage network the disconnector 19 is closed by the circuit 27. The breakers 20–22 are after that closed by circuit 27 which means that the charging current will flow from one phase 4 of the alternating voltage network through the resistor 18 through inductor 14 to the converter 8 to charge the capacitor 9 providing a direct voltage output. Resistor 18 maintains the charging current at a considerably lower level than otherwise would be the case, and there is no risk for any over-voltage to develop on capacitor 9. The means 26 will measure the voltage across tho capacitor 9 and send the measured information to the arrangement 27. The arrangement 27 also includes means to measure the time from the closing of the connection line 7 through the disconnector 19 and the breaker 22. The arrangement opens the breakers 20, 21, 22 and breaks the connection between one phase 4 and the converter 8 if the voltage across the capacitor 9 after a certain period of time has not reached a certain level which indicates something is wrong, such as for example an earth fault on the direct voltage side of the converter.

However, the arrangement 27 closes the disconnectors 15, 16, 17 when a predetermined threshold voltage for the voltage across the capacitor 9 is exceeded, if this takes place within a certain period of time, normally some hundreds milliseconds, and alternating voltage network 1 is completely connected with all the phases to the converter 8 and the resistor 18 will be shunted from the circuit. No resistor is needed for the phases 2 and 3, since the capacitor is already charged, so that the closing takes place with substantially no current through each of the phases.

The fact that the alternating current filter 23 is connected to the connection line 7 between the resistor 18 and the alternating voltage source 1 means that the fundamental frequency currents (50 or 60 Hz) through the filter will not flow through the resistor 18, so that the rated power thereof may be reduced considerably, and it may therefore be made less costly. Alternating current filters are of course also connected to the other phases, but these are not shown in the drawing, since they have nothing to do with the present invention.

Figure 2:
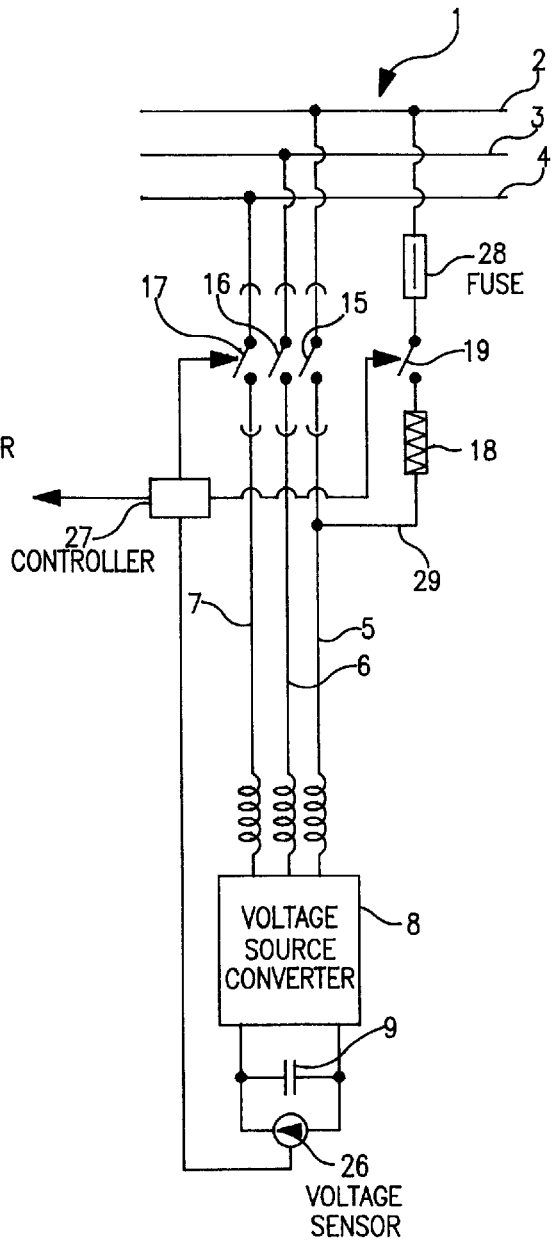
FIG. 2 is a view corresponding to FIG. 1 of a device according to a second preferred embodiment of the invention.

A device according to a second preferred embodiment of the invention applied to a plant of the type described with reference to FIG. 1 is shown in FIG. 2, and the parts of this plant and this device corresponding to the parts in FIG. 1 have been provided with the same reference numerals. The first breaking means 15, 16, 17 are in this case formed by extractable breakers arranged on a carriage, which may be moved out so as to indicate a visible isolation upon disconnection. The additional breaking means in the form of a disconnector 19 is connected in series with a resistor 18 and a fuse 28 in a line 29 between one of the phases 4 of the alternating voltage network 1, and a point between a first breaking means 15 and the converter 8 of one of the connection lines 5 belonging to another of the phases 2. Upon receipt of a voltage from the arrangement 27, the disconnector will be firstly closed and the capacitor 9 will then be charged through the phase 2 by a current through the resistor 18. The arrangement 27 will then, as set forth in the description of FIG. 1, control closing of the breaking means 15–17, or opening the disconnector 19 when information is received from the measuring means 26 with the time elapsed since the closing of the disconnector 19 indicates a problem. It is also possible that the arrangement 27 after closing the breakers 15–17 opens the disconnector 19, but this is not necessary.

Breaking means in this disclosure is defined as a general definition for all conceivable means with a capability of interrupting a connection, such as breakers and disconnectors. Breakers are defined as breaking means with a capability to break a current and comprises are extinguishing means and the like, while disconnectors are normally operated currentless or in some cases under voltage with limited currents and may therefore be made considerably simpler and less costly than breakers.

The time necessary for the different connection procedures described above for complete connection of the converter to the alternating voltage network is typically in the order of seconds. The voltage levels of said network may be 10–500 kV, well 10–30 kV.

The invention is of course not in any way restricted to the preferred embodiments described above, but many modifications thereof would be apparent to one skilled in the art without departing from the basic idea of the invention as is defined in the claims.

It is emphasized that the claims also comprise the case in which the different operations mentioned to be done therethrough are carried out by hand by an operator.

The number of phases of the alternating voltage network could for example be different. The same is valid for the capacitor 9, which could be replaced by a plurality of capacitors connected in series, such as two having a grounded midpoint for voltage potential definition.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain the best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A device for connecting a voltage source converter to a source of alternating voltage having multiple phases through a plurality of inductances, said VSC converter providing a direct current voltage to a capacitor for a power transmission plant comprising:

a first breaking means connected to said source of alternating voltage multiple phases for individually interrupting each of said multiple phases;

an additional circuit breaking means connecting said first breaking means in series with one of said phases and said voltage source converter;

a resistor connected across said first breaking means for supplying current from said one of said phases to said additional circuit breaking means when said first breaking means is in an open condition; and circuit means connected to said first breaking means and said additional circuit means, said circuit means changing said additional circuit breaking means from an interrupting condition to a closed condition, and subsequently changing said first breaking means from an interrupting condition to a closed condition.

2. A device according to claim 1, wherein the additional breaking means is a disconnector.

3. The device according to claim 1 wherein said first circuit breaking means in the closed position shunts said resistor.

4. The device according to claim 1 wherein said first breaking means includes a set of switching contacts for each phase, and said resistor is connected across a set of switching contacts which is connected to said one phase.

5. A device according to claim 4, wherein said additional breaking means is connected in series with the parallel connection of the resistor and said first breaking means.

6. The device according to claim 4 wherein said additional breaking means connects said converter to said set of contacts connected to said first phase.

7. The device according to claim 5 further comprising a second breaking means connected between said source of alternating voltage and said first breaking means which are closed prior to closing said first set of breaking means.

8. The device according to claim 7 wherein said first breaking means are disconnectors.

9. A device according to claim 7, further comprising an alternating current filter for eliminating harmonic currents, connected between the resistor and the second breaking means.

10. A device according to claim 7, wherein said additional breaking means is formed by said second breaking means connected to said one phase.

11. A device according to claim 7, wherein said additional breaking means is in series with the first circuit breaking means phase between the converter and the first breaking means.

12. The device according to claim 11 wherein said circuit means is connected to said additional breaking means and said second breaking means, said circuit means closing said second breaking means following closing of said first breaking means.

13. The device according to claim 1 wherein said circuit means measures an output voltage of said voltage source converter and activates said first breaking means to close when said output voltage exceeds a predetermined level.

14. The device according to claim 1 wherein said circuit means includes: means for measuring an output voltage of said voltage source converter;

means for initiating a timing sequence when said additional breaking is closed; and means for opening said additional breaking means when said measured output voltage is below a reference value at the end of said timing sequence to avoid supplying voltage to said capacitor when a fault condition exists on said voltage source converter.

15. A device according to claim 1, wherein said first breaking means and the additional breaking means usually indicate a portion of a respective connection line is in the open state.

16. A device according to claim 1, wherein the alternating voltage network has a voltage level between 10 and 100 kV.

17. A device according to claim 1, wherein said voltage source converter is connected to a direct voltage network for high voltage direct current (HVDC).

18. A device according to claim 1, wherein said voltage source converter is included in an SVC (Static Var Compensator).

19. The device of claim 1 wherein said circuit means is connected to detect a d.c. voltage from said voltage source converter, and changes said first breaking means to a closed condition in response to a detected d.c voltage.

20. A device for connecting a voltage source converter to a source of alternating voltage having multiple phases through a plurality of inductances, said voltage source converter providing a direct current voltage to a capacitor for a power transmission plant comprising:

a first breaking means connected to said source of alternating voltage multiple phases for supplying multiple switched phases of said voltage source to multiple inputs of said voltage source converter;

an additional breaking means connected to one of said phases and to one of said inputs through a resistor; and a circuit means connected to close said additional breaking means and subsequently close said first breaking means whereby said voltage source converter is initially connected to one phase of alternating voltage before connecting the other phases of said source of alternating voltage to said remaining inputs of said voltage converter.

21. The device according to claim 20 wherein said circuit means closes said first breaking means in response to a direct current voltage produced by said voltage source converter.

* * * * *